Feb. 23, 1943.　　　M. M. SENSENICH　　　2,312,219
AIRCRAFT PROPELLER
Filed April 21, 1941　　　2 Sheets-Sheet 2
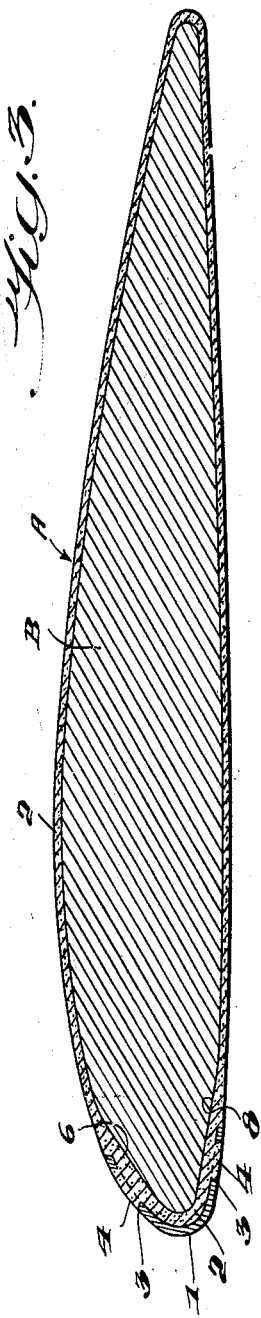
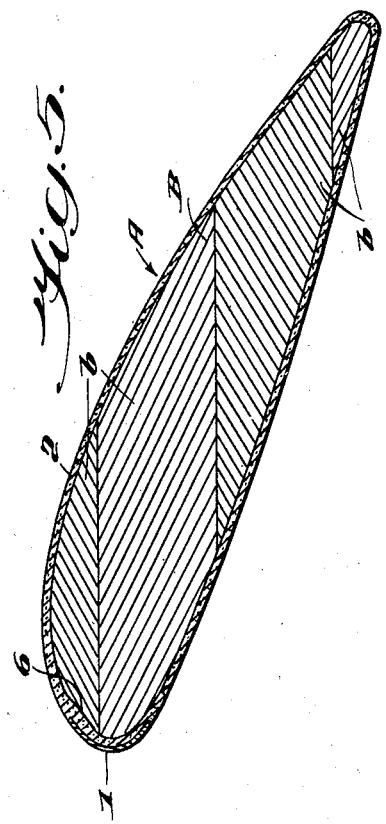
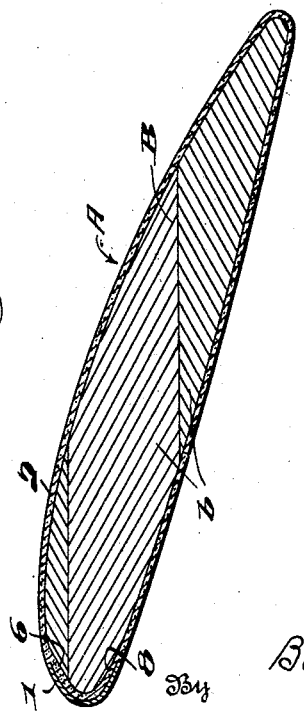
Inventor
MARTIN M. SENSENICH,
By Babcock & Babcock
Attorneys Patented Feb. 23, 1943

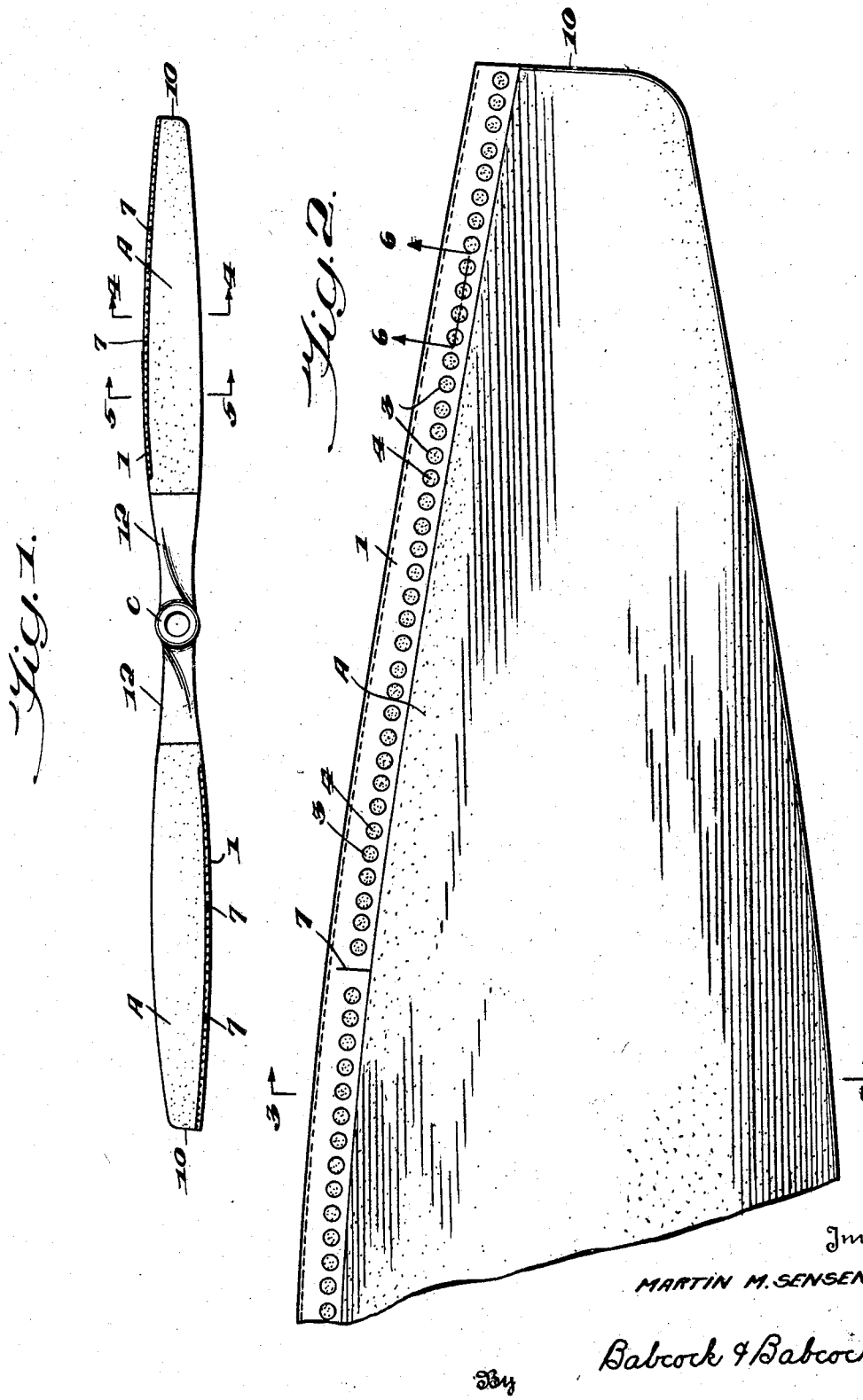

2,312,219

UNITED STATES PATENT OFFICE 2,312,219

AIRCRAFT PROPELLER

Martin M. Sensenich, Lititz, Pa., assignor to Sensenich Brothers, Lancaster County, near Lititz, Pa., a copartnership composed of himself and Harry M. Sensenich Application April 21, 1941, Serial No. 389,635

2 Claims. (Cl. 170—159)

This invention relates to propellers, and more particularly to aircraft propellers which employ protective strips or tippings applied to the leading edges of the blades thereof to protect the same from damage by rain, hail, sleet, sand, or other matter frequently encountered by the propeller blades during rotation at high speeds.

Prior to the present invention it has been known to protect the leading edges of propeller blades by securing a metal tipping or strip thereover by fastening means such as nails, screws, or rivets passing into the wood or other material of the body portion of the propeller blade; also, where the blade or portions thereof were covered by a plastic skin or coating, by securing the protective strip or tipping to a relatively wide piece of metal gauze which was embedded in the plastic material.

In the first mentioned application of the protective strip by means of screws etc., the material of the propeller blade was considerably weakened by the holes formed by such fastening means, and in addition undesirable weight was added, not only by the fastening means themselves, but also by the extra width or breadth required of the protective strip in order to permit disposition of the fastening means rearwardly of the leading edge in a relatively thick portion of the blade. In the second above mentioned application of the protective strip by means of a plastic and wire gauze embedded therein, the resulting combined weight of both the wire gauze and protective strip was undesirable, and the time and expense required for such a construction was greater than in applicant's present construction.

Applicant's invention has been developed with the foregoing considerations in mind and accordingly has for its primary object to provide a propeller blade or other object coated with a plastic material at its leading edge portion wherein the protective strip is placed over and bonded directly to the plastic material without the intervention of any auxiliary fastening means such as nails, rivets etc. passing into and weakening the blade body, or wire gauze etc. embedded in the plastic and increasing the weight and cost of production of the finished propeller.

Further objects are: to provide such a construction of propeller blade wherein the protective strip need be only of sufficient breadth to cover the leading edge of the blade; to provide such a protective strip which will not in any way weaken the blade construction, but rather will tend to strengthen the same; and, to provide such a construction wherein the protective strip may be easily and cheaply applied to produce a propeller blade of great efficiency, strength and light weight, and may also be easily removed and replaced.

In this application I show and describe only the preferred embodiment of my invention simply by way of illustration of the practice of my invention, as by law required. However, I recognize that my invention is capable of other and different embodiments, and that the various details thereof may be modified in various ways, all without departing from my said invention; therefore, the drawings and description herein are to be considered as merely illustrative and not as exclusive.

In the accompanying drawings:

Figure 1 represents an elevation of a propeller illustrating generally, and on a very small scale, the preferred embodiment of my invention;

Figure 2, a greatly enlarged detail elevation of the radially outer end portion or tip of one of the propeller blades illustrated generally in Figure 1;

Figure 3, an enlarged section on the line 3—3 of Figure 2, looking in the direction of the arrows, this view being on roughly twice the scale of Figure 2 to clearly illustrate the structural details at the leading edge of the propeller blade;

Figure 4, a section on the line 4—4 of Figure 1, looking in the direction of the arrows, this being on substantially the same scale as Figure 2;

Figure 5, a section on the line 5—5 of Figure 1, looking in the direction of the arrows, this also being on substantially the same scale as Figure 2; and, Figure 6, a greatly enlarged or magnified detail section through the plastic skin or coating and the protective strip or tipping at the leading edge of the propeller blade, this being taken on the line 6—6 of Figure 2 looking in the direction of the arrows.

Referring now in detail to the accompanying drawings, the propeller shown in Figure 1 may comprise any suitable number of blades of suitable shape, each of which is designated A in its entirety, attached in suitable manner to a hub C, though in the drawing the propeller is of the two-bladed type wherein the blades A are integrally attached to the hub C.

Inasmuch as my invention will normally be embodied in substantially the same manner in each of the blades of the propeller, and the invention relates more particularly to the individual blade construction than to the propeller in its entirety, the description hereinafter will be directed simply to one of such propeller blades embodying the preferred form of my invention.

In general, such a blade A will comprise a suitably shaped body portion or member B on which is secured a plastic material coating or skin 2 covering the leading edge thereof and having a plurality of plastic material fastening studs 4 formed integral therewith on either side of the leading edge of said blade A, in combination with a metal or other suitable material tipping or protective strip 1 disposed around the leading edge over the coating or skin 2 and having a plurality of perforations 3 receiving the studs 4 in order to fixedly maintain the strip 1 in proper operative position, all as best shown in Figure 3 of the accompanying drawings.

The above mentioned blade body or body portion or member B may be of any preferably non-metal or other material of such nature, or for use under such conditions, as will make it desirable to apply some form of protective strip or tipping 1 to the leading edge thereof, the preferred embodiment of such blade body B being of usual suitably shaped laminated wood construction and each of the several laminations being designated by the letter b.

In actual practice it has been found desirable, though not essential, to slightly modify or alter the shape of the blade body B from the usual conventional shape by forming longitudinally or radially extending flattened faces or surfaces 6 and 8 respectively on either side of the leading edge to compensate for the additional bulk of the protective strip 1 and skin 2 so that the leading edge portion of the finished propeller blade may be of the desired streamline shape; and further, to form the radially outer end edge 10 of the blade body B as a straight edge extending at preferably slightly less than right angles to the blade length, such arrangement serving to eliminate any necessity for any complex longitudinal curvature or other special formation of the protective strip 1 and also serving accordingly to maintain the weight of such strip at a minimum, it being noted of course that with such arrangement no portion of the blade end will project radially beyond the leading edge of said blade, hence a strip 1 of simple easily obtainable shape applied only to the leading edge of the blade and extending completely to the outer end thereof will serve effectually to protect the entire blade outer end.

The skin or coating 2 may be of any usual suitable plastic material such as viscose, cellulose acetate, or the like, applied and secured in suitable fashion to the blade body or member B and preferably entirely covering or enveloping all but the radially inner end portion or root 12 thereof, which may be finished in any suitable fashion, though it is essential only that the leading edge portion of the blade body B be so covered.

The most practicable and efficient such coating 2 at present known to me has been found to consist of cellulose acetate, preferably applied in sheet form and bonded to the blade body B by a suitable bonding material such as cellulose acetate cement, to form a normally tough hornlike strengthening and protective skin 2 which may be either left transparent to permit inspection of the blade body B therethrough, or have suitable coloring matter mixed therein.

In applying such a coating 2 it has been found preferable to form the cellulose acetate sheet material in two pieces corresponding in shape to and slightly larger than the respective opposite faces of the blade body B to overlap at the edges when cemented in place thereon, and thus be of extra or substantially double thickness at the leading, trailing, and end edges of the blade where such extra thickness is most needed. Prior to cementing the coating 2 in position it is desirable, and in accordance with usual practice, to roughen the surface of the blade body B as by scraping the same with a toothed scraper to promote the adherence of the coating 2 thereto.

The tipping or protective strip 1, which is preferably formed of brass or other suitable metal or material having the desired characteristics, is in the form of a comparatively thin longitudinally extending strip or sheet of a length corresponding to the portion of the blade leading edge which is to be protected, and is curved transversely in such a manner that its externally presented surface is of the cross-sectional configuration desired in the finished propeller blade. In accordance with usual practice, the strip 1 may be formed with several suitably spaced cuts 7 on either side thereof extending from outer marginal edges thereof transversely inwardly towards the center of the strip 1 to permit of increased flexibility and close conformity with the longitudinal curvature of the leading edge of the blade.

In the preferred embodiment of the invention, the perforations 3 in strip 1 are regularly spaced, of uniform size and shape, and arranged in straight longitudinally extending rows along the respective marginal edges of the tipping or strip 1, this being the most efficient disposition of such perforations 3 at present known to me, though obviously such perforations could be disposed in various other ways and of various other shapes without departing from my invention.

Preferably each of said perforations 3 is circular in shape and countersunk or conical so that its externally presented diameter is larger than its internally presented diameter adjacent the coating 2, whereby each said perforation is defined by a conical or outwardly flaring annular wall 5, best shown in Figure 6, adapted to engage and interlock with one of the correspondingly outwardly flared projecting plastic material studs or interlocking members 4 formed on the skin or coating 2.

The aforementioned studs or members 4 of coating 2 are preferably formed during the process of applying the protective stripping 1 to the leading edge of the propeller blade, at which time the plastic material at the leading edge of the blade may be softened or plasticized in any suitable manner and the strip 1 then pressed thereinto to have its external forwardly presented surface lie flush with and constitute a continuation of the plastic material surface of the blade. Such pressure and partial embedding of the strip 1 in coating 2 will of course cause the plasticized material to be extruded through the perforations 3 to conform in shape to and completely fill the same, thus not only forming an effectual interlock therewith when hardened but also effectually sealing said perforations against penetration by moisture.

In the preferred method of applying the strip or tipping 1 to the preferred embodiment of the invention wherein the skin 2 is composed of cellulose acetate, the tipping or strip 1 is heated in any suitable manner, as by an electrical resistance or heating unit, while being held and pressed into the skin 2 which is softened by the heat, or plasticized. Thereafter, when the source of heat is removed the skin 2 and studs 4 formed thereon will harden to a tough hornlike state, and by cooperation with the perforations 3 of the strip 1, form a strong bond fixedly durably securing the strip 1 in position.

It is to be noted that in a propeller blade constructed in accordance with my invention, due to the transverse curvature of the strip 1 around the leading edge of the blade A, said leading edge is sandwiched or clamped between the transversely opposed marginal portions of the strip 1 and thus held firmly in engagement with the opposed sides of the coated leading edge portion of the blade, thus although preferable, it is not essential to have the perforations 3 and their cooperating studs 4 flared as illustrated.

It is further to be noted that in such preferred construction, a substantial thickness of coating or skin 2 is left between the strip 1 and blade body B (this being permitted in the preferred embodiment by the special formation embodying the flat faces 6 and 8 at the leading edge portion of the blade body), so that application of the strip 1 produces no thin or weakened zone in the coating 2 along the leading edge; that the strip 1 extends around the edge or line of juncture between the several sheets of material, where such sheet material is used to form the skin, and thereby tends to strengthen the bond between said sheets; that the strip 1 is required to be only of sufficient width to cover the leading edge of the blade and does not require any auxiliary fastening means such as nails, screws or rivets producing or requiring holes in the blade body B, or metal gauze embedded in the plastic skin 2 and adding undesirable weight to the finished blade; and that plasticizing the plastic material skin 2 at the leading edge portion of the propeller blade A of my invention will permit of easy removal and economical replacement of the strip 1 where needed without disturbing the remaining portions of the blade.

I claim:

1. An aircraft propeller blade comprising a suitably shaped wooden body member, a plastic material coating secured to and covering the leading edge and adjacent portions thereof, and longitudinally extending rows of outwardly flared projecting studs of plastic material integral with said coating on both sides of said leading edge, in combination with a longitudinally extending metal protective strip disposed around the leading edge of said propeller blade and having rows of countersunk perforations disposed along its opposed marginal edges and conformingly receiving said flared studs to fixedly secure said strip in position, the body portion of said propeller blade having flattened faces on either side of its leading edge so that the external surface presented by the protective strip and plastic coating may be of the desired airfoil section while permitting a substantial thickness of plastic material to extend around said leading edge beneath said protective strip.

2. A propeller blade comprising a body member, a plastic material coating secured over the leading edge portion thereof, and plastic material studs integral with and projecting from said coating on both sides of the propeller blade leading edge, in combination with a protective strip embedded in said coating over said leading edge so as to have its surface lie flush with the adjacent surface of said coating, said strip being formed along its opposed marginal edges with rows of perforations receiving said studs and being otherwise of unbroken area.

MARTIN M. SENSENICH.